US010656470B2

(12) United States Patent
Higano (10) Patent No.: US 10,656,470 B2
(45) Date of Patent: May 19, 2020

(54) DISPLAY DEVICE

(71) Applicant: Japan Display Inc., Minato-ku (JP)

(72) Inventor: Toshiyuki Higano, Tokyo (JP)

(73) Assignee: Japan Display Inc., Minato-ku (JP)

( * ) Notice: Subject to any disclaimer, the term of this patent is extended or adjusted under 35 U.S.C. 154(b) by 60 days.

(21) Appl. No.: 15/841,430

(22) Filed: Dec. 14, 2017

(65) Prior Publication Data
US 2018/0196291 A1 Jul. 12, 2018

(30) Foreign Application Priority Data
Jan. 6, 2017 (JP) ................................ 2017-001242

(51) Int. Cl.
*G02F 1/1339* (2006.01)
*G02F 1/1345* (2006.01)
*G02F 1/1333* (2006.01)
*G02F 1/1337* (2006.01)

(52) U.S. Cl.
CPC .......... *G02F 1/1339* (2013.01); *G02F 1/1337* (2013.01); *G02F 1/13452* (2013.01); *G02F 1/13458* (2013.01); *G02F 1/133305* (2013.01); *G02F 1/133351* (2013.01); *G02F 2202/28* (2013.01); *G02F 2203/02* (2013.01)

(58) Field of Classification Search
CPC ............. G02F 1/1339; G02F 1/133351; G02F 2202/28; G02F 1/1337
See application file for complete search history.

(56) References Cited

U.S. PATENT DOCUMENTS

| 7,019,800 | B2 | 3/2006 | Kuo |
| 8,961,730 | B2 * | 2/2015 | Chen ................. B32B 37/12 156/272.2 |
| 2009/0103010 | A1 | 4/2009 | Okamoto et al. |
| 2010/0079693 | A1 * | 4/2010 | Yoshida ............ G02F 1/134363 349/40 |
| 2010/0110652 | A1 * | 5/2010 | Takane ................. C09J 9/02 361/783 |
| 2011/0234967 | A1 * | 9/2011 | Kim .................. G02F 1/133351 349/155 |
| 2016/0247981 | A1 * | 8/2016 | Yang .................. H01L 51/56 |

FOREIGN PATENT DOCUMENTS

| JP | 10-246892 | 9/1998 |
| JP | 2000-056315 | 2/2000 |
| JP | 2004-062138 | 2/2004 |
| JP | 2005-208479 | 8/2005 |
| JP | 2009-098425 | 5/2009 |
| JP | 2009-173723 | 8/2009 |
| JP | 2011-128224 | 6/2011 |

* cited by examiner

*Primary Examiner* — Jessica M Merlin
(74) *Attorney, Agent, or Firm* — Oblon, McClelland, Maier & Neustadt, L.L.P.

(57) ABSTRACT

According to one embodiment, a display device includes a first substrate, a second substrate, an adhesive, an electro-optical layer, a terminal portion, and a reflective material. The first substrate is attached to the second substrate with the adhesive. The terminal portion is provided in the first substrate. The reflective material contains in the adhesive. The second substrate has flexibility. The terminal portion is provided on an external side in comparison with the adhesive as seen in plan view.

19 Claims, 7 Drawing Sheets

DISPLAY DEVICE

CROSS-REFERENCE TO RELATED APPLICATIONS

This application is based upon and claims the benefit of priority from Japanese Patent Application No. 2017-001242, filed Jan. 6, 2017, the entire contents of which are incorporated herein by reference.

FIELD

Embodiments described herein relate generally to a display device.

BACKGROUND

A display device comprises, for example, an array substrate, a counter-substrate facing the array substrate, an electro-optical layer provided between the array substrate and the counter-substrate, and an external circuit substrate mounted on the array substrate. As the bases of the array substrate and the counter-substrate, glass substrates are commonly used. However, in a display device comprising a curved display area, resinous substrates having flexibility are employed for the bases.

When the external circuit substrate is mounted on the array substrate, the terminal portion of the array substrate is exposed by trimming the counter-substrate. When the base of the counter-substrate is a glass substrate, the counter-substrate can be easily trimmed by making a cut and bending the counter-substrate. When the base of the counter-substrate is a resinous substrate having flexibility, the counter-substrate cannot be broken along the cut by merely bending the counter-substrate. To trim the flexible counter-substrate, it is necessary to irradiate it with laser light or cut it with rotary teeth.

Since the electro-optical layer such as a liquid crystal layer or an organic electroluminescent layer is thin, the distance between the counter-substrate and the array substrate is short. When the counter-substrate is trimmed with laser light, the array substrate may be damaged as well as the counter-substrate. Thus, a technology for forming a metal layer reflecting laser light on the array substrate to protect the array substrate is suggested.

However, lines for transmitting a video signal, etc., are densely packed in the terminal portion of the array substrate exposed by trimming. When a metal layer is formed on the lines, coupling is generated between the lines and the metal layer. The apparent resistance of the lines is increased. When the resistance of the lines is increased, the S/N ratio of the signal transmitted to the lines is decreased. Further, the number of manufacturing steps is increased to form the metal layer. In general, since the adhesive force of the sealing material used to attach the array substrate and the counter-substrate is strong. Thus, the edge portion of the cut counter-substrate cannot be easily removed from the adhesive. Various other problems are present regarding the trimming of the counter-substrate.

DETAILED DESCRIPTION

In general, according to one embodiment, a display device includes a first substrate, a second substrate, an adhesive, an electro-optical layer, a terminal portion, and a reflective material. The second substrate faces the first substrate. The first substrate is attached to the second substrate with the adhesive. The electro-optical layer is provided between the first substrate and the second substrate. The terminal portion is provided in the first substrate. The terminal portion is supplied with a signal from an external circuit. The reflective material contains in the adhesive. The second substrate has flexibility. The terminal portion is provided on an external side in comparison with the adhesive as seen in plan view.

According to another embodiment, a display device includes a first substrate, a second substrate, an adhesive, an electro-optical layer, a terminal portion, and a reflective material. The second substrate faces the first substrate. The first substrate is attached to the second substrate with the adhesive. The electro-optical layer is provided between the first substrate and the second substrate. The terminal portion is provided in the first substrate. The terminal portion is supplied with a signal from an external circuit. The second substrate includes a transparent base. The transparent base has a thickness less than or equal to 50 µm. The terminal portion is provided on an external side in comparison with the adhesive as seen in plan view.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes and the like of the respective parts are schematically illustrated in the drawings, compared to the actual modes. However, the schematic illustration is merely an example, and adds no restrictions to the interpretation of the invention. Besides, in the specification and drawings, the structural elements having functions which are identical or similar to the functions of the structural elements described in connection with preceding drawings are denoted by like reference numerals, and an overlapping detailed description is omitted unless otherwise necessary.

In this specification, the expressions "α includes A, B or C", "α includes one of A, B and C" and "α includes one selected from the group consisting of A, B and C" does not exclude a case where α includes a plurality of combinations of A to C unless otherwise specified. Further, these expressions do not exclude a case where α includes other elements.

In the following explanation, as an example of a display device, a liquid crystal display device DSP is disclosed. However, the present embodiment does not prevent application of individual technical ideas disclosed in the embodiment to other types of display devices. The main structures disclosed in the present embodiment may be applied to a self-luminous display device such as an organic electroluminescent (EL) display device, an electronic paper-type display device having a cataphoretic element, etc., a display device to which micro-electromechanical systems (MEMS) are applied, a display device to which electrochromism is applied, etc. The display device DSP may be used for various devices such as a smartphone, a tablet terminal, a mobile phone, a personal computer, a television receiver, a vehicle-mounted device, a game console and a wearable terminal.

Figure 1:
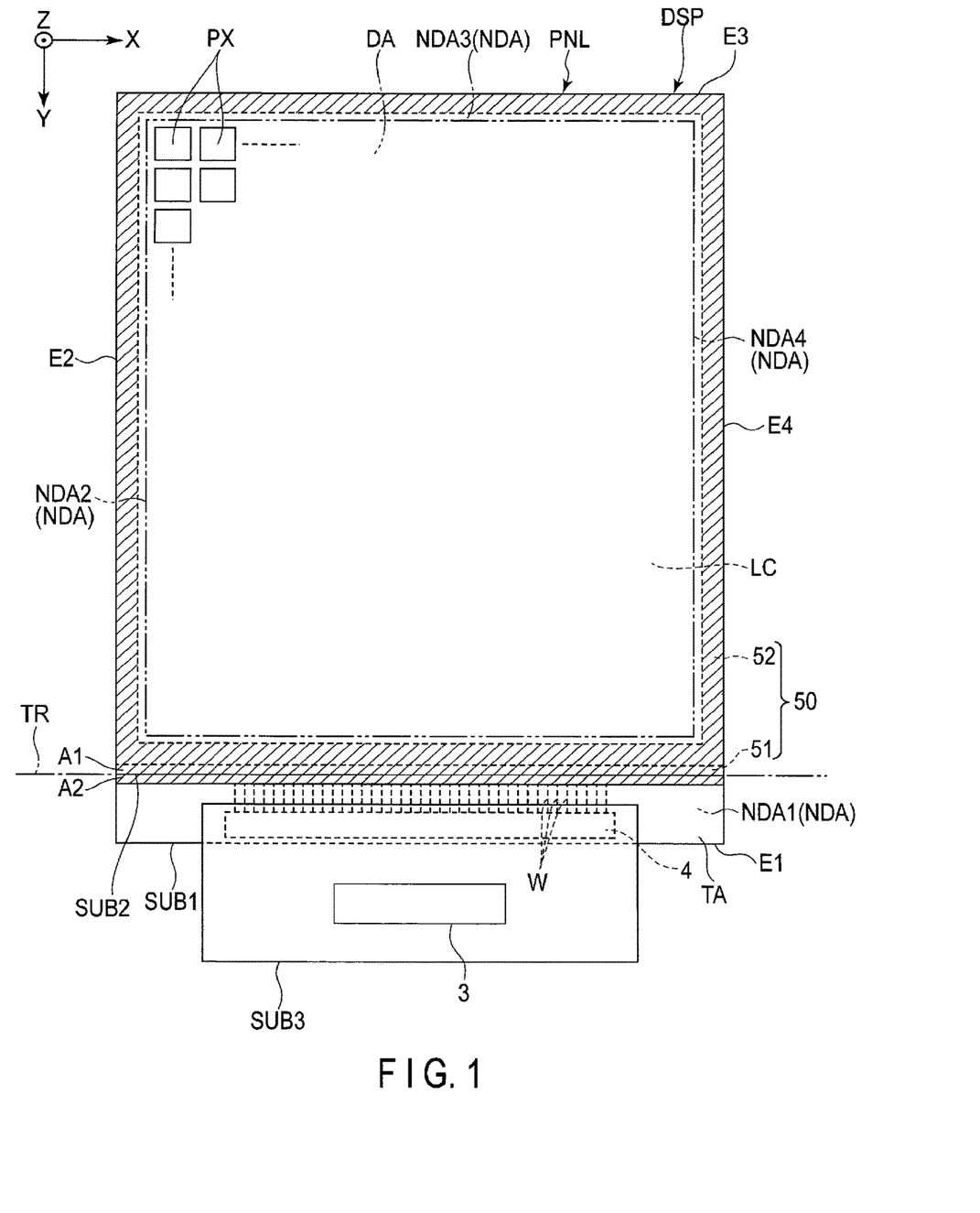
FIG. 1 is a plan view showing the general structure of a display device according to an embodiment.
Figure 3:
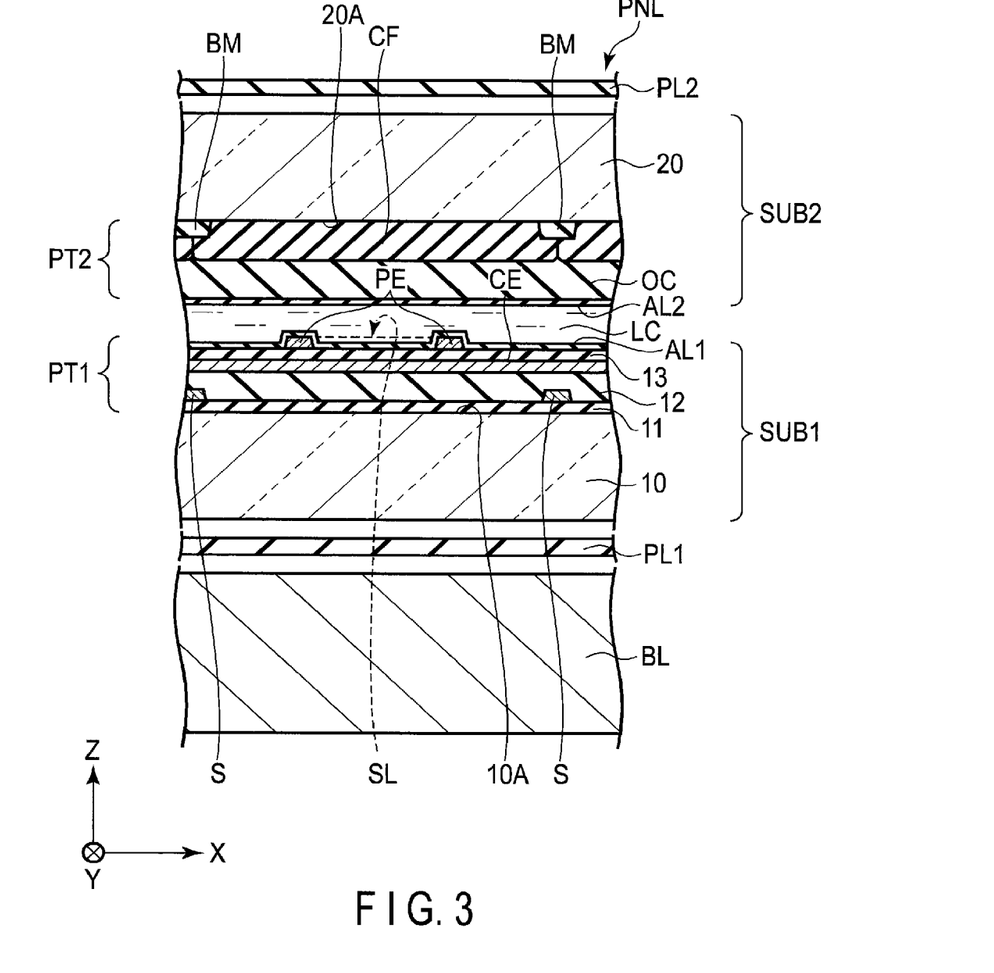
FIG. 3 is a cross-sectional view showing the structure of the display area shown in FIG. 1.

FIG. 1 is a plan view showing the general structure of the display device DSP. The display device DSP comprises, for example, a display panel (liquid crystal cell) PNL, a backlight BL (as shown in FIG. 3) which irradiates the display panel PNL with light, and a third substrate SUB3 which controls the operation of the display panel PNL and the backlight BL. The third substrate SUB3 is an example of an external circuit substrate.

In the following explanation, as shown in FIG. 1, a plan view is defined as appearance from the display surface to the rear surface of the display panel PNL. Further, a first direction X, a second direction Y and a third direction Z are defined as shown in FIG. 1. The first direction X is, for example, a direction along the short sides of the display panel PNL. The second direction Y is, for example, a direction along the long sides of the display panel PNL. The third direction Z is, for example, the thickness direction of the display panel PNL. In the example shown in FIG. 1, the first to third directions X, Y and Z are perpendicular to one another. The first to third directions X, Y and Z may intersect at other angles.

The display panel PNL comprises a first substrate (array substrate) SUB1, a second substrate (counter-substrate) SUB2, an adhesive (sealing material) 50 and a liquid crystal layer LC. The second substrate SUB2 faces the first substrate SUB1 in the third direction Z. The first substrate SUB1 is larger than the second substrate SUB2. The first substrate SUB1 comprises first to fourth sides E1, E2, E3 and E4. For example, the first and third sides E1 and E3 are short sides in the first direction X. The second and fourth sides E2 and E4 are long sides in the second direction Y.

The adhesive 50 is equivalent to the portion indicated with upward-sloping hatch lines in FIG. 1. The first substrate SUB1 is attached to the second substrate SUB2 with the adhesive 50. The adhesive 50 includes a first adhesive 51 and a second adhesive 52. The second adhesive 52 is formed in first to fourth non-display areas NDA1, NDA2, NDA3 and NDA4 as described later. The first adhesive 51 is formed in the first non-display area NDA1 described later. A short side of the second substrate SUB2 overlaps the first adhesive 51 as seen in plan view. The alternate long and short dash line added along the short side is a section line TR of the second substrate SUB2. The first adhesive 51, the second adhesive 52 and the section line TR are explained in detail later.

The liquid crystal layer LC is provided between the second substrate SUB2 and the first substrate SUB1 on the inner side in comparison with the adhesive 50. The liquid crystal layer LC is an example of an electro-optical layer driven by electricity and selectively transmitting light. The display panel PNL may be, for example, either a transmissive display panel which displays an image by selectively transmitting light from the rear surface of the first substrate SUB1 or a reflective display panel which displays an image by selectively reflecting light entering the second substrate SUB2.

The display panel PNL comprises a display area DA which displays an image, and a non-display area NDA which has a frame shape and surrounds the display area DA from four directions. In the display area DA, the display panel PNL comprises a plurality of pixels PX arrayed in matrix in the first direction X and the second direction Y.

The non-display area NDA comprises the first to fourth non-display areas NDA1, NDA2, NDA3 and NDA4. The first non-display area NDA1 is provided between the display area DA and the first side E1. Similarly, the second non-display area NDA2 is provided between the display area DA and the second side E2. The third non-display area NDA3 is provided between the display area DA and the third side E3. The fourth non-display area NDA4 is provided between the display area DA and the fourth side E4.

The first non-display area NDA1 includes a terminal area TA. The terminal area TA is an area in which the first substrate SUB1 does not face the second substrate SUB2. The first substrate SUB1 comprises a terminal portion 4 and a plurality of lines W in the terminal area TA. The lines W electrically connects the various circuits formed in the non-display area NDA and the terminal portion 4.

The third substrate SUB3 is mounted on the first substrate SUB1, and is electrically connected to the terminal portion 4. Various signals are supplied from the third substrate SUB3 to the terminal portion 4. For example, a control module 3 which is an IC is mounted on the third substrate SUB3. The control module 3 receives, for example, the image data of one frame to be displayed in the display area DA from the main board of the electronic device on which the display device DSP is mounted. The image data includes information such as the display color of each pixel PX. The control module 3 supplies a signal for driving each pixel PX to the display panel PNL based on the received image data.

Figure 2:
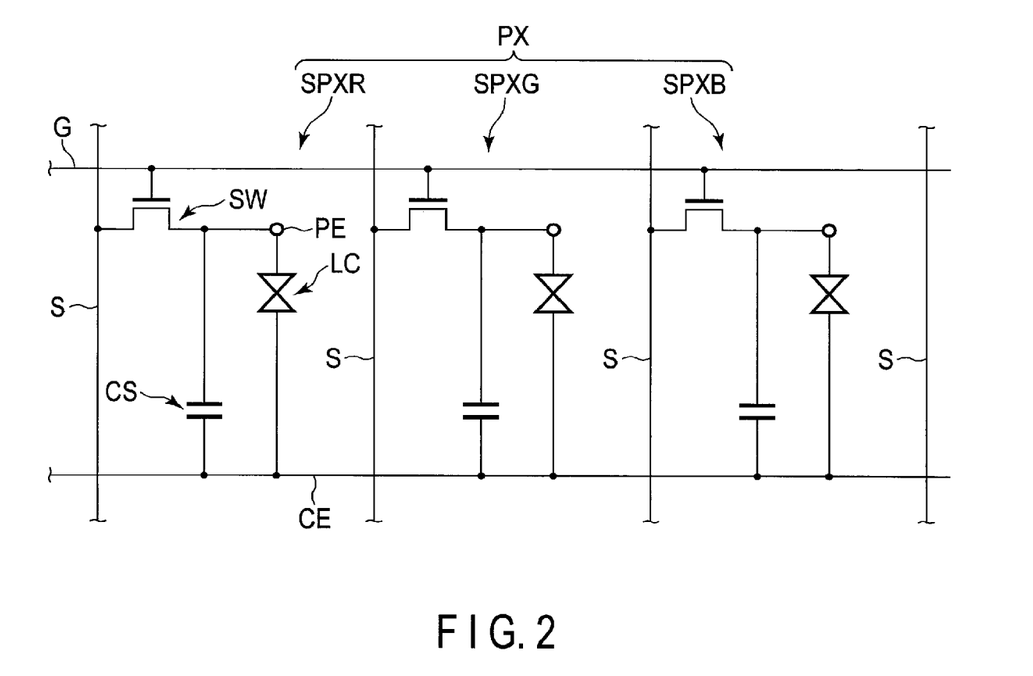
FIG. 2 is a circuit diagram showing an example of each pixel shown in FIG. 1.

FIG. 2 is a circuit diagram showing a structural example of each pixel PX. Each pixel PX includes, for example, three sub-pixels SPX (SPXR, SPXG and SPXB) corresponding to red (R), green (G) and blue (B), respectively. For example, each sub-pixel SPX is provided in an area surrounded by scanning lines G to which a scanning signal is supplied and signal lines S to which a video signal is supplied.

In the display area DA, each scanning line G extends in the first direction X. Each signal line S extends in the second direction Y. A common electrode CE is provided over a plurality of pixels PX. Each scanning line G, each signal line S and the common electrode CE are extended to the non-display area NDA and are electrically connected to the terminal portion 4 via a driver circuit or the lines W.

Each sub-pixel SPX comprises a switching element SW, a pixel electrode PE and the common electrode CE. Each switching element SW is formed by, for example, a thin-film transistor (TFT), and is electrically connected to a corresponding scanning line G, a corresponding signal line S and a corresponding pixel electrode PE. Each pixel electrode PE faces the common electrode CE. The liquid crystal layer LC is driven by the electric field generated between each pixel electrode PE and the common electrode CE. Storage capacitance CS is formed between, for example, the common electrode CE and each pixel electrode PE.

FIG. 3 is a cross-sectional view obtained by cutting the display device DSP in the display area DA in the first direction X. The display panel PNL further comprises a first polarizer PL1 and a second polarizer PL2. The first polarizer PL1 is provided between the backlight BL and the display panel PNL. The second polarizer PL2 is provided on the display side of the display panel PNL.

In the example shown in FIG. 3, the display panel PNL comprises a structure corresponding to a display mode mainly using a lateral electric field substantially parallel to the X-Y plane. The display panel PNL may comprise a structure corresponding to a display mode using a longitudinal electric field perpendicular to the X-Y plane, an oblique electric field with respect to the X-Y plane or a combination thereof.

In a display mode using a lateral electric field, both the pixel electrodes PE and the common electrode CE are included in the first substrate SUB1. In a mode using a longitudinal electric field or an oblique electric field, for example, the pixel electrodes PE are included in the first substrate SUB1, and the common electrode CE is included in the second substrate SUB2.

In the example shown in FIG. 3, the first substrate SUB1 comprises a first flexible substrate 10 having flexibility, a circuit layer PT1 formed on the first flexible substrate 10, and a first alignment film AL1 formed on the circuit layer PT1. The circuit layer PT1 includes the signal lines S, the common electrode CE, the pixel electrodes PE, a first insulating film 11, a second insulating film 12, a third insulating film 13, etc. In FIG. 3, the scanning lines G, the switching elements SW and various insulating films interposed between them are omitted.

The first insulating film 11 is located on an upper surface 10A of the first flexible substrate 10. The scanning lines G and the switching elements SW (not shown) are located between the first flexible substrate 10 and the first insulating film 11. The signal lines S are located on the first insulating film 11. The second insulating film 12 is located on the signal lines S and the first insulating film 11.

The common electrode CE is located on the second insulating film 12. The third insulating film 13 is located on the common electrode CE. The pixel electrodes PE face the common electrode CE via the third insulating film 13. The pixel electrodes PE comprise a slit SL at a position facing the common electrode CE. The first alignment film AL1 covers the pixel electrodes PE and the third insulating film 13.

The scanning lines G and the signal lines S are formed of a metal material such as molybdenum, tungsten, titanium or aluminum. The scanning lines G and the signal lines S may have either a single-layer structure or a multi-layer structure. The common electrode CE and the pixel electrodes PE are formed of a transparent conductive material such as indium tin oxide (ITO) or indium zinc oxide (IZO). The first and third insulating films 11 and 13 are inorganic insulating films. The second insulating film 12 is an organic insulating film.

The second substrate SUB2 comprises a second flexible substrate 20 having flexibility, a coloring layer PT2 and a second alignment film AL2. The first and second flexible substrates 10 and 20 are formed of polyimide resin having translucency and flexibility. For example, the thickness of the first and second flexible substrates 10 and 20 is approximately 10 μm. When the thickness of the first and second flexible substrates 10 and 20 is less than or equal to 50 μm, the first and second substrates SUB1 and SUB2 are sufficiently flexible. Thus, the display panel PNL can be bent. The first and second flexible substrates 10 and 20 are examples of a transparent substrate. The first and second alignment films AL1 and AL2 are formed of, for example, polyimide resin, and align the liquid crystal molecules of the liquid crystal layer LC. The second alignment film AL2 is explained in detail later with reference to FIG. 6 and FIG. 7.

The coloring layer PT2 includes a light-shielding layer (black matrix) BM formed in matrix, a color filter CF, an overcoat OC, etc. The light-shielding layer BM and the color filter CF are located on a lower surface 20A of the second flexible substrate 20. The light-shielding layer BM is located immediately above the signal line S and defines the sub-pixels SPX. The color filter CF faces the pixel electrodes PE, and partially overlaps the light-shielding layer BM.

The color filter CF includes a red color filter, a green color filter, a blue color filter, etc. The red color filter is provided in the sub-pixel SPXR. The green color filter is provided in the sub-pixel SPXG. The blue color filter is provided in the sub-pixel SPXB. The overcoat OC covers the color filter CF. The second alignment film AL2 covers the overcoat OC. In the example shown here, the color filter CF is formed in the second substrate SUB2. However, the color filter CF may be formed in the first substrate SUB1.

Figure 4:
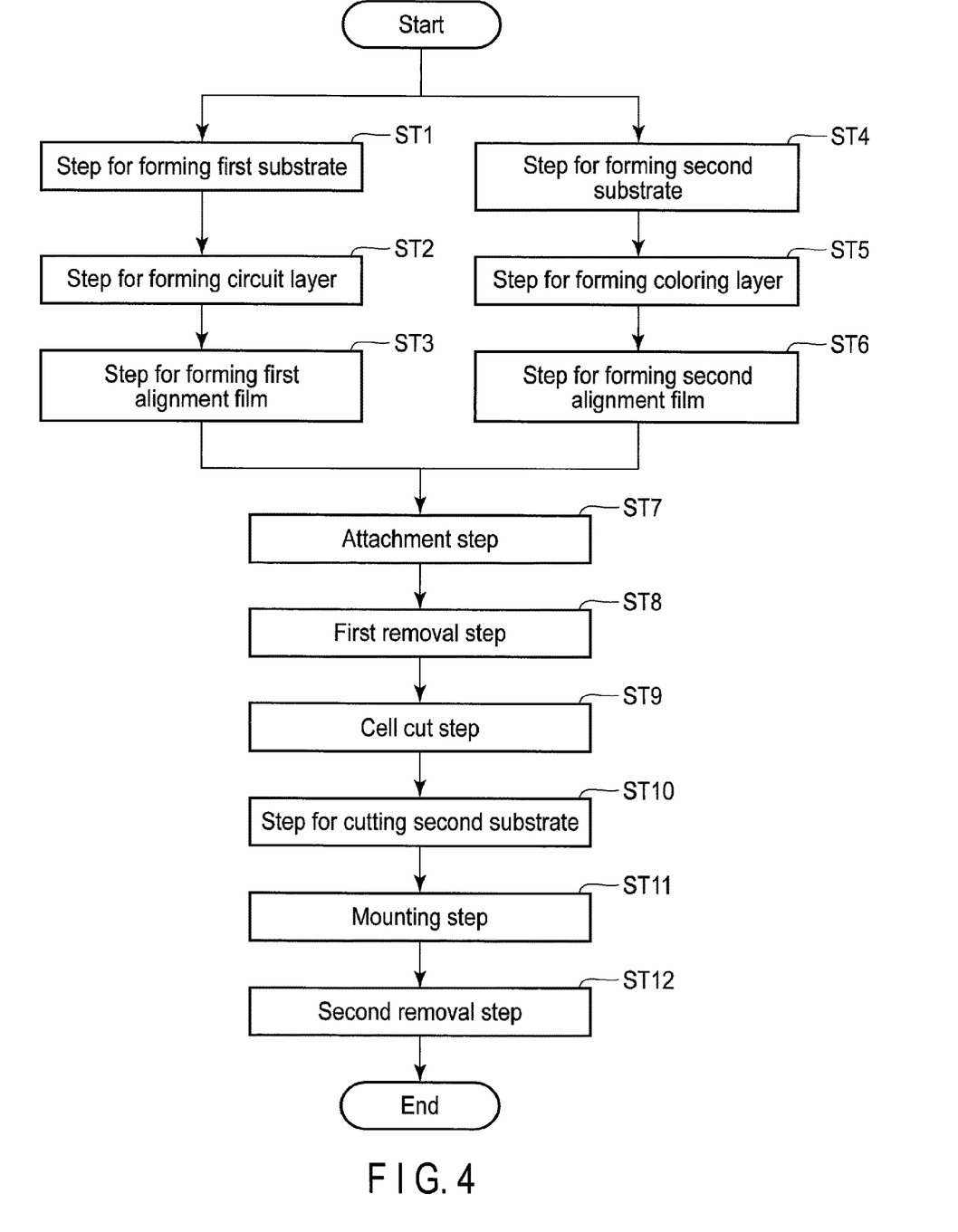
FIG. 4 is a flowchart showing an example of a method for manufacturing the display device shown in FIG. 1.

FIG. 4 is a flowchart showing an example of a method for manufacturing the display device DSP. This specification explains a method for manufacturing the display device DSP with reference to FIG. 4. The first substrate SUB1 is prepared in steps ST1 to ST3. The second substrate SUB2 is prepared in steps ST4 to ST6. In steps ST7 to ST12, the first and second substrates SUB1 and SUB2 are attached to each other, and the third substrate SUB3 is mounted on the first substrate SUB1.

Steps ST1 to ST3 are explained. The material of the first flexible substrate 10 is applied to the upper surface of a first glass substrate (equivalent to the glass substrate GL1 shown in FIG. 7). The first flexible substrate 10 is formed by processing the applied material (in step ST1 for forming the first substrate). For example, a composition containing polyamide acid is applied onto the first glass substrate. By applying heat treatment at 300 to 500° C. for imidization, the first flexible substrate 10 can be formed as a polyimide film.

Subsequently, the circuit layer PT1 is formed on the first flexible substrate 10 (in step ST2 for forming the circuit layer). Further, the first alignment film AL1 is formed on the circuit layer PT1 (in step ST3 for forming the first alignment film). A motherboard including a plurality of first substrates SUB1 is formed on the first glass substrate in steps ST1 to ST3.

Now, this specification explains steps ST4 to ST6. In a manner similar to that of step ST1, the second flexible substrate 20 is formed on a second glass substrate (in step ST4 for forming the second substrate). The coloring layer PT2 is formed on the second flexible substrate 20 (in step ST5 for forming the coloring layer). In a manner similar to that of step ST3, the second alignment film AL2 is formed on the coloring layer PT2 (in step ST6 for forming the second alignment film). A motherboard including a plurality of second substrates SUB2 is formed on the second glass substrate in steps ST4 to ST6.

Now, steps ST7 to ST12 are explained. The motherboard including the first substrates SUB1 is attached to the motherboard including the second substrates SUB2 by applying the adhesive 50 (in an attachment step ST7). The process of step ST7 includes, for example, a step for applying the composition of the adhesive 50 to the motherboards, a step for dropping the liquid crystal layer LC into the inner side surrounded by the adhesive 50, a step for attaching two motherboards, a step for curing the adhesive 50, etc. The adhesive 50 used in step ST7 is explained in detail later with reference to FIG. 5.

The second glass substrate is removed from the second flexible substrate 20 (in a first removal step ST8). When laser light is emitted to the second flexible substrate 20 through the translucent second glass substrate, the second flexible substrate 20 absorbs laser light and is slightly decomposed. A gap is defined at the interface between the second flexible substrate 20 and the second glass substrate. Thus, the second glass substrate is removed from the second flexible substrate 20.

The motherboards including the first and second substrates SUB1 and SUB2 are cut together with the first glass substrate, thereby obtaining a plurality of panels (in a cell cut step ST9). At this stage, each panel is in a state where the first and second substrates SUB1 and SUB2 having the same size are stacked as seen in plan view. Each divisional first glass substrate (glass substrate GL1) adds rigidity to the first substrate SUB1 to prevent the deformation of the first substrate SUB1 in step ST11. Further, each divisional first glass substrate (glass substrate GL1) protects the first substrate SUB1 in step ST11 such that the first substrate SUB1 is not damaged.

The terminal portion 4 of the first substrate SUB1 is exposed by cutting the second substrate SUB2 with laser light (in step ST10 for cutting the second substrate). In this way, the terminal area TA is formed. Steps ST9 and ST10 may be performed as one step. Step ST10 is explained in detail later with reference to FIG. 6 and FIG. 7.

A method for mounting the third substrate SUB3 on the exposed terminal portion 4 is explained (in a mounting step ST11). An anisotropically conductive film 41 is provided on the terminal portion 4 in FIG. 7. The anisotropically conductive film 41 is a film-like adhesive containing conductive particles evenly dispersed. Both pressure and heat are applied to the first and third substrates SUB1 and SUB3 from the upper and lower sides. A part of the anisotropically conductive film 41 is melted, thereby electrically and mechanically connecting the first and third substrates SUB1 and SUB3.

In a manner similar to that of the first removal step ST8, the glass substrate GL1 is removed from the first flexible substrate 10 (in a second removal step ST13). The first and second polarizers PL1 and PL2 are attached to the panel obtained in the above manner. By incorporating the backlight BL, the display device DSP is obtained.

Figure 5:
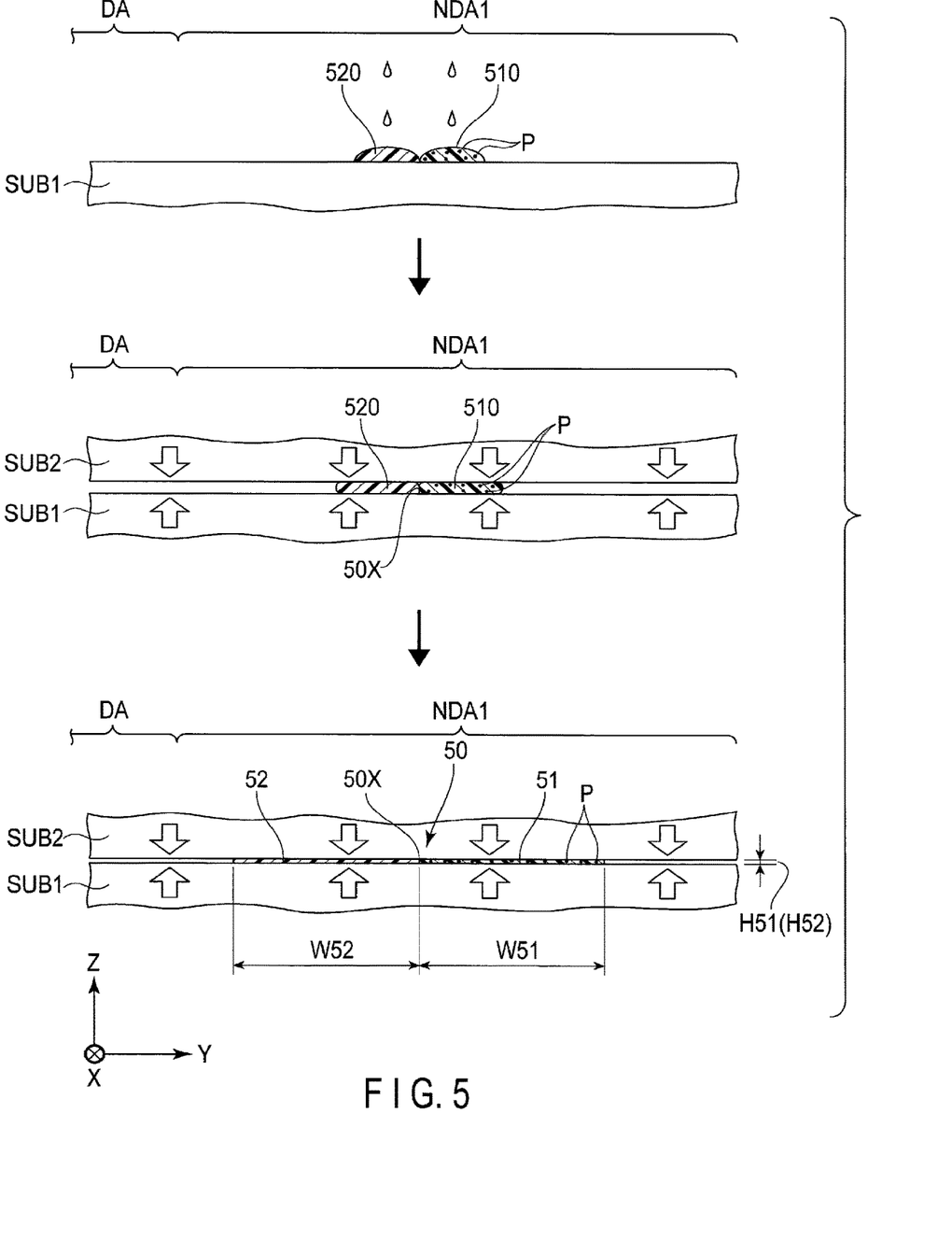
FIG. 5 is a cross-sectional view for explaining the attachment process shown in FIG. 4.

FIG. 5 is a cross-sectional view of the first non-display area NDA1 for explaining the attachment step ST7 shown in FIG. 4. In the attachment step ST7, as shown in the bottom figure, the adhesive 50 is formed between the first substrate SUB1 and the second substrate SUB2. The adhesive 50 of the present embodiment includes the first adhesive 51 and the second adhesive 52.

As shown in the top figure, a second composition 520 which is the composition of the second adhesive 52 is applied to the non-display area NDA (specifically, the first to fourth non-display areas NDA1, NDA2, NDA3 and NDA4 shown in FIG. 1). A first composition 510 which is the composition of the first adhesive 51 is applied to the first non-display area NDA1. The first composition 510 is applied to the external side in comparison with the second composition 520 (in other words, to a side more distant from the display area DA than the second composition 520). For example, the first and second compositions 510 and 520 may be applied at the same time, using dispensers which discharge the respective compositions. After one of the first and second compositions 510 and 520 is applied, the other one may be applied.

As shown in the middle figure, the first composition 510 and the second composition 520 collide with and are attached firmly to each other when the second substrate SUB2 is pressed to the first substrate SUB1 after the first and second compositions 510 and 520 are applied. The first and second adhesives 51 and 52 curing the first and second compositions 510 and 520 are in contact with each other at an interface 50X and are firmly attached to each other.

As shown in the bottom figure, the first adhesive 51 has thickness H51 in the third direction Z in a state where the first and second substrates SUB1 and SUB2 are attached to each other. Similarly, the second adhesive 52 has thickness H52 in the third direction. Thickness H51 is substantially equal to thickness H52. In the second direction Y, the first adhesive 51 has width W51, and the second adhesive 52 has width W52. For example, both thickness H51 and thickness H52 are less than or equal to a tenth part of the sum (W51+W52) of width W51 and width W52, and are preferably less than or equal to a thirtieth part of the sum. When this relationship is satisfied, the thickness of the electro-optical layer and the display panel can be reduced. Further, the strength of the display panel can be increased. In the liquid crystal display device, the value of retardation can be decreased. In the example of FIG. 5, thickness H51 is, for example, approximately 3 μm, and width W51 is, for example, 200 to 600 μm. Similarly, thickness H52 is, for example, approximately 2 to 3 μm, and width W52 is, for example, 200 to 600 μm.

With regard to the second adhesive 52 which is in contact with the liquid crystal layer LC, the selection of the material is restricted to prioritize, for example, a property which prevents a detrimental effect on the liquid crystal layer LC. The composition 510 of the first adhesive 51 does not have this restriction. Thus, the material can be widely selected. In the present embodiment, the adhesive force of the first adhesive 51 for the second substrate SUB2 is less than that of the second adhesive 52 for the second substrate SUB2. When this relationship is satisfied, an edge portion SUB2E of the second substrate SUB2 can be easily removed in FIG. 7. The adhesive force of the first adhesive 51 for the second substrate SUB2 is, for example, approximately 0.1 N/25 mm in a 180° removal test compliant with JIS Z0237:2000.

The first adhesive 51 of the present embodiment contains a reflective material P reflecting laser light. The reflective material P is formed in, for example, a particle shape. The reflective material P preferably has a peak greater than or equal to a wavelength reflectance of 50% in a wavelength range of 300 to 600 nm including an ultraviolet range. As the reflective material P having a high reflectance in an ultraviolet range, for example, the particles of barium sulfate, aluminum hydroxide, aluminum oxide, calcium hydroxide, calcium oxide, calcium carbonate, cerium oxide or mica are considered.

The type of the reflective material P may be appropriately selected in accordance with the wavelength of the laser light used in step ST10 for cutting the second substrate. For example, the reflective material P may be the metal particles of gold, silver or copper. Since no liquid passes through these particles, the moisture permeability of the first adhesive 51 can be less than that of the second adhesive 52.

The second adhesive 52 is formed of a material having an adhesive force greater than that of the first adhesive 51. The second adhesive 52 is fixed to the first and second substrates SUB1 and SUB2, and fixes the first adhesive 51 at the interface 50X. Even when the adhesive force of the first adhesive 51 is weak, the first adhesive 51 is hardly removed since it is fixed by the adjacent second adhesive 52.

The first and second compositions 510 and 520 preferably have carbon frameworks in the same system. The carbon frameworks of the first and second compositions 510 and 520 are, for example, acrylic resin. When the first and second compositions 510 and 520 have carbon frameworks in the same system, the compatibility of the first and second compositions 510 and 520 is high. Thus, the first and second compositions 510 and 520 are firmly attached at the interface 50X.

Figure 6:
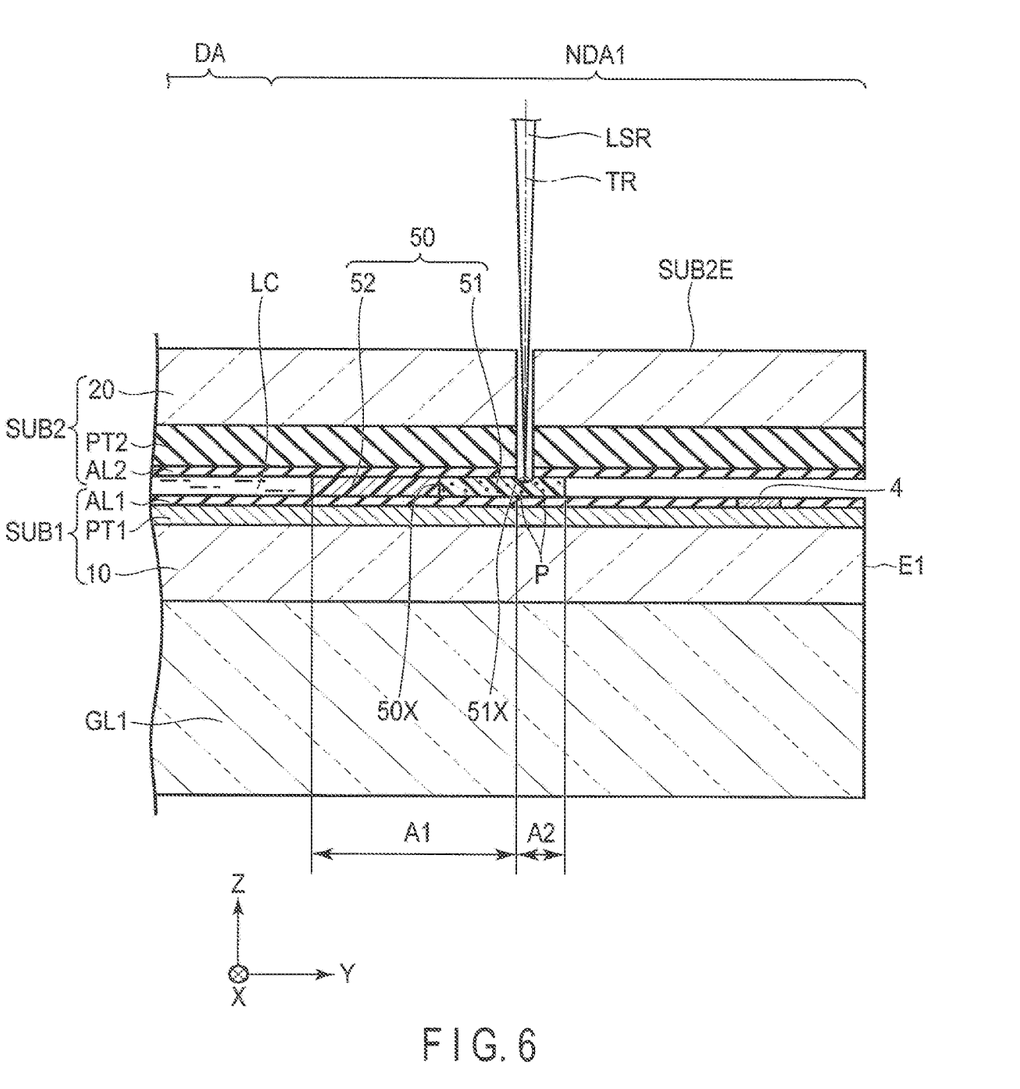
FIG. 6 is a cross-sectional view for explaining the process for cutting a second substrate shown in FIG. 4.
Figure 7:
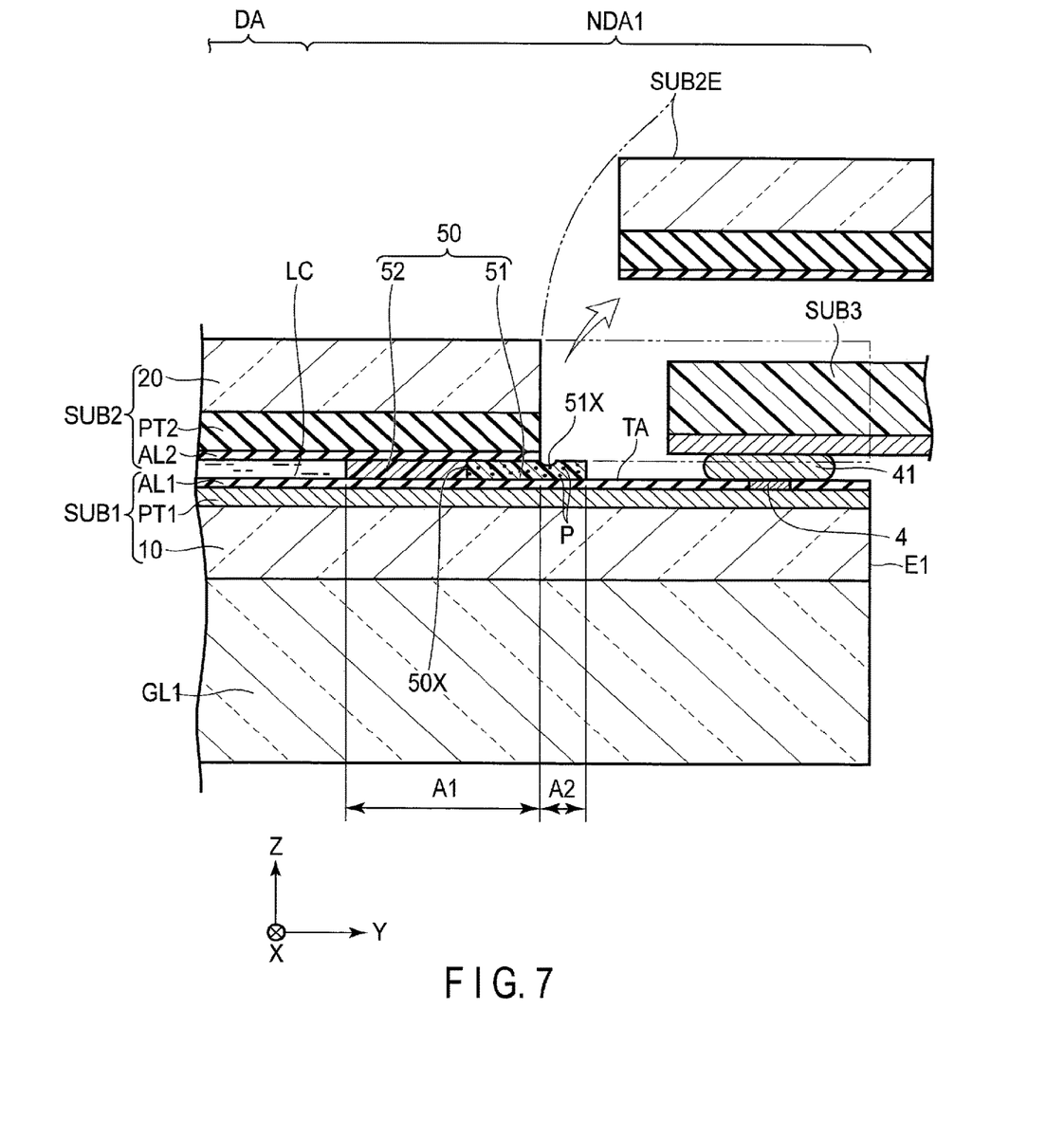
FIG. 7 is a cross-sectional view for explaining the process for cutting the second substrate shown in FIG. 4 after FIG. 6.

Now, this specification explains step ST10 for cutting the second substrate with reference to FIG. 1, FIG. 6 and FIG. 7. In step ST10 for cutting the second substrate, laser light LSR is emitted along the section line TR shown in FIG. 1 to cut the second substrate SUB2. As shown in FIG. 1, the section line TR overlaps the first adhesive 51 as seen in plan view. As seen in plan view, the third substrate SUB3 is mounted on an external side in comparison with the first adhesive 51 containing the reflective material P (in other words, on a side more distant from the display area DA than the first adhesive 51). As seen in plan view, the adhesive 50 comprises a first area A1 which is in contact with the second substrate SUB2, and a second area A2 which is not in contact with the second substrate SUB2.

FIG. 6 and FIG. 7 are cross-sectional views of the first non-display area NDA1 for explaining step ST10 for cutting the second substrate shown in FIG. 4. In step ST10 for cutting the second substrate, the edge portion SUB2E is removed from the second substrate SUB2. Before the removal, the edge portion SUB2E is a portion of the second substrate SUB2 on an external side in comparison with the section line TR, and faces the terminal portion 4.

As shown in FIG. 6, when laser light LSR is emitted, the first adhesive 51 reflects laser light LSR by the reflective material P. Thus, it is possible to prevent the first adhesive 51 from melting before the second substrate SUB2 is cut. In the first adhesive 51, a concavity 51X may be formed along the section line TR. However, it is possible to sufficiently ensure a temporal difference between when the second substrate SUB2 is cut and when the first adhesive 51 is cut. When the edge portion SUB2E is removed from the second substrate SUB2, as shown in FIG. 7, the terminal area TA of the first substrate SUB1 is formed. In this way, the terminal portion 4 is exposed.

As laser light LSR used in step ST10 for cutting the second substrate, for example, laser light having a wavelength of 300 to 600 nm including an ultraviolet light range is preferably used. Laser light having a short wavelength makes it difficult to increase the temperature of the second substrate SUB2 to be processed. Thus, the effect of thermal stress on the display panel PNL can be minimized.

As the laser light in an ultraviolet range, for example, excimer laser light (having a wavelength of 193 or 248 nm) or ultraviolet (UV) light (having a wavelength of 355 nm) is considered. Laser light may be either green laser light (having a wavelength of 532 nm) in a visible range or carbon dioxide ($CO_2$) laser light (having a wavelength of 9.4 or 10.6 μm) in an infrared range.

In step ST10 for cutting the second substrate shown in FIG. 6, the second alignment film AL2 is formed in an area equivalent to the first area A1 and the second area A2, and overlaps the section line TR. The second alignment film AL2 absorbs laser light LSR in step ST10 for cutting the second substrate. When laser light is absorbed into the second alignment film AL2, the first adhesive 51 is not excessively cut by laser light LSR. Thus, it is possible to prevent the damage of the first substrate SUB1. After step ST10 for cutting the second substrate, the second alignment film AL2 extends from the display area DA to the boundary between the first and second areas A1 and A2 of the adhesive 50. The display area DA is substantially equivalent to the area in which the liquid crystal layer LC is provided. The boundary between the first and second areas A1 and A2 of the adhesive 50 is substantially equivalent to the section line TR. Neither the first adhesive 51 nor the second adhesive 52 may be in contact with the second alignment film AL2.

In the display device DSP of the present embodiment having the above structure, the reflective material P is contained in the adhesive 50 for attaching the first and second substrates SUB1 and SUB2. Since the laser light for cutting the flexible second substrate SUB2 is reflected by the reflective material P of the adhesive 50, the laser light does not damage the first substrate SUB1.

As one of the features of the present embodiment, the first adhesive 51 of the adhesive 50 contains the reflective material P which reflects laser light LSR instead of an absorptive material which absorbs laser light LSR. If the adhesive contains, for example, carbon black which absorbs laser light, the adhesive may melt before the second substrate SUB2 is cut. Thus, the display panel PNL may be damaged. This problem can be prevented in the present embodiment.

The first adhesive 51 contains, as the reflective material P, particles having a high reflectance in an ultraviolet range, for example, the particles of barium sulfate, aluminum hydroxide, aluminum oxide, calcium hydroxide, calcium oxide, calcium carbonate, cerium oxide or mica. Thus, when laser light LSR is ultraviolet light, etc., laser light LSR can be effectively reflected. Since no liquid passes through these inorganic particles, the moisture permeability of the adhesive 50 can be decreased.

Since the adhesive 50 of the present embodiment comprises the first adhesive 51, the moisture path from outside to the display area DA on the internal side in comparison with the adhesive 50 is longer than that of a case where only the second adhesive 52 is provided. Thus, the moisture permeability of the adhesive 50 can be decreased. As shown in FIG. 7, a space greater than or equal to the total width (W51+W52) of the first and second adhesives 51 and 52 is already ensured in the first non-display area NDA1 in which the third substrate SUBS is mounted. Even when the adhesive 50 is wide, the adhesive 50 does not prevent the reduction of the width of the frame.

The second adhesive 52 has to be formed of a material which does not cause contamination even when the second adhesive 52 is in contact with the liquid crystal layer LC. The material which can be selected for the second adhesive 52 is restricted. The moisture permeability cannot be prioritized when the material is selected. In the present embodiment, the moisture permeability of the first adhesive 51 having less restrictions than the second adhesive 52 in material selection can be less than that of the second adhesive 52. Thus, the moisture permeability of the adhesive 50 in the first non-display area NDA can be decreased.

The first adhesive 51 is formed of a material having an adhesive force less than that of the second adhesive 52 for the second substrate SUB2. Thus, when the second substrate SUB2 is removed in step ST10 for cutting the second substrate, the load on the first substrate SUB1 is small. However, the first and second adhesives 51 and 52 are in contact with each other at the interface 50X, and are firmly attached to each other. Even when the adhesive force of the first adhesive 51 is weak, the first adhesive 51 is fixed by the second adhesive 52. Thus, it is possible to prevent the removal of the first adhesive 51 from the first substrate SUB1.

The second alignment film AL2 of the present embodiment extends to the boundary between the first area A1 in which the adhesive 50 is in contact with the second substrate SUB2 and the second area A2 in which the adhesive 50 is not in contact with the second substrate SUB2. The second alignment film AL2 extends to the section line TR in which laser light LSR is emitted to the first adhesive 51 in step ST10 for cutting the second substrate. In the present embodiment, since laser light is absorbed into the second alignment film AL2, it is possible to prevent laser light LSR from damaging the first substrate SUB1.

Various other excellent effects can be obtained from the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the electro-optical layer is not limited to a liquid crystal layer. As stated at the beginning, for example, an organic EL element or a cataphoretic element may be used. For example, the terminal area TA may be provided on both the first and third sides E1 and E3 of the first substrate SUB1 instead of only the first side E1. In this case, the first adhesive 51 attached firmly to the second adhesive 52 of the third non-display area NDA3 may be formed, and step ST10 for cutting the second substrate may be repeated to expose the third side E3. Similarly, the first adhesive 51 and the terminal area TA may be added to the second and fourth sides E2 and E4. For example, the timing for removing the first and second glass substrates is not limited to the example shown in FIG. 4. The first and second glass substrates may be removed earlier than the example shown in FIG. 4. For example, the method for injecting the liquid crystal layer LC is not limited to a one drop fill method for injecting the liquid crystal layer LC at the same time as the attachment of the first and second substrates SUB1 and SUB2. A vacuum injection method for attaching the first and second substrates SUB1 and SUB2 to each other and subsequently inserting the liquid crystal layer LC may be employed.

What is claimed is:

1. A display device comprising:
a first substrate;
a second substrate facing the first substrate;
an adhesive with which the first substrate is attached to the second substrate;
a liquid crystal layer provided between the first substrate and the second substrate;
a terminal portion provided in the first substrate, and supplied with a signal from an external circuit; and
a reflective material contained in the adhesive, wherein
the second substrate has flexibility and comprises an alignment film which aligns a liquid crystal molecule of the liquid crystal layer,
the terminal portion is provided on an external side in comparison with the adhesive as seen in plan view,
the adhesive comprises a first area which is in contact with the second substrate, and a second area which is not in contact with the second substrate, as seen in plan view,
the second area is provided on an external side in comparison with the first area,
the terminal portion and the second area are exposed from the second substrate, and
the alignment film extends to a boundary between the first area and the second area.

2. The display device of claim 1, wherein
the adhesive comprises a first adhesive and a second adhesive,
the first adhesive is provided on an external side in comparison with the second adhesive, and
an adhesive force of the first adhesive for the second substrate is less than an adhesive force of the second adhesive for the second substrate.

3. The display device of claim 2, wherein
the first adhesive contains the reflective material, and
the second adhesive does not contain the reflective material.

4. The display device of claim 2, wherein
the first adhesive is in contact with the second adhesive.

5. The display device of claim 1, wherein
the reflective material has a peak greater than or equal to a wavelength reflectance of 50% in a wavelength range of 300 to 600 nm.

6. The display device of claim 1, wherein
the reflective material is formed in a particle shape and contains a material selected from a group consisting of barium sulfate, aluminum hydroxide, aluminum oxide, calcium hydroxide, calcium oxide, calcium carbonate, cerium oxide and mica.

7. The display device of claim 1, wherein
the first adhesive comprises a first adhesive and a second adhesive,
the first adhesive is provided on an external side in comparison with the second adhesive,
the first adhesive contains the reflective material and
the second adhesive does not contain the reflective material.

8. The display device of claim 7, wherein
the first adhesive is in contact with the second adhesive.

9. The display device of claim 1, wherein
a thickness of the adhesive is less than or equal to a tenth part of a width of the adhesive.

10. A display device comprising:
a first substrate;
a second substrate facing the first substrate;
an adhesive with which the first substrate is attached to the second substrate;
a liquid crystal layer provided between the first substrate and the second substrate;
a terminal portion provided in the first substrate, and supplied with a signal from an external circuit; and
a reflective material contained in the adhesive, wherein
the second substrate comprises a transparent base and comprises an alignment film which aligns a liquid crystal molecule of the liquid crystal layer,
the transparent base has a thickness less than or equal to 50 μm,
the terminal portion is provided on an external side in comparison with the adhesive as seen in plan view,
the adhesive comprises a first area which is in contact with the second substrate, and a second area which is not in contact with the second substrate, as seen in plan view,
the second area is provided on an external side in comparison with the first area,
the terminal portion and the second area are exposed from the second substrate, and
the alignment film extends to a boundary between the first area and the second area.

11. The display device of claim 10, wherein
the adhesive comprises a first adhesive and a second adhesive, the first adhesive is provided on an external side in comparison with the second adhesive, and an adhesive force of the first adhesive for the second substrate is less than an adhesive force of the second adhesive for the second substrate.

12. The display device of claim 11, wherein the first adhesive contains the reflective material, and the second adhesive does not contain the reflective material.

13. The display device of claim 10, wherein the adhesive comprises a first adhesive and a second adhesive, the first adhesive is provided on an external side in comparison with the second adhesive, the first adhesive contains the reflective material, and the second adhesive does not contain the reflective material.

14. A display device comprising:

a first substrate;

a second substrate facing the first substrate;

an adhesive with which the first substrate is attached to the second substrate;

a liquid crystal layer provided between the first substrate and the second substrate; and a terminal portion provided in the first substrate, and supplied with a signal from an external circuit, wherein the adhesive includes a first adhesive and a second adhesive, the first adhesive is provided on an external side in comparison with the second adhesive as seen in plan view, an adhesive force of the first adhesive for the second substrate is less than an adhesive force of the second adhesive for the second substrate, the second substrate has flexibility or has a thickness less than or equal to 50 µm, the second substrate comprises an alignment film which aligns a liquid crystal molecule of the liquid crystal layer, the terminal portion is provided on an external side in comparison with the adhesive as seen in plan view, the adhesive comprises a first area which is in contact with the second substrate, and a second area which is not in contact with the second substrate, as seen in plan view, the second area is provided on an external side in comparison with the first area, the terminal portion and the second area are exposed from the second substrate, and the alignment film extends to a boundary between the first area and the second area.

15. The display device of claim 14, wherein the first substrate comprises end sides, the end sides including a first side and a second side, the first substrate comprises a non-display area, the non-display area including a first non-display area corresponding to the first side, and a second non-display area corresponding to the second side, and the second adhesive and the first adhesive are provided in the first non-display area, and the second adhesive is provided in the second non-display area, and the first adhesive is not provided in the second non-display area.

16. The display device of claim 15, wherein the first adhesive contains a reflective material.

17. The display device of claim 14, wherein the first adhesive contains a reflective material.

18. The display device of claim 14, wherein the first adhesive is in contact with the second adhesive.

19. The display device of claim 14, wherein a thickness of the adhesive is less than or equal to a tenth part of a width of the adhesive.

* * * * *